United States Patent
Rankl et al.

(10) Patent No.: US 8,803,658 B2
(45) Date of Patent: Aug. 12, 2014

(54) METHOD, PORTABLE DATA CARRIER, AND SYSTEM FOR RELEASING A TRANSACTION USING AN ACCELERATION SENSOR TO SENSE MECHANICAL OSCILLATIONS

(75) Inventors: Wolfgang Rankl, Munich (DE); Michael Baldischweiler, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 320 days.

(21) Appl. No.: 13/381,691

(22) PCT Filed: Jun. 30, 2010

(86) PCT No.: PCT/EP2010/059274
§ 371 (c)(1),
(2), (4) Date: Dec. 30, 2011

(87) PCT Pub. No.: WO2011/000864
PCT Pub. Date: Jan. 6, 2011

(65) Prior Publication Data
US 2012/0119875 A1    May 17, 2012

(30) Foreign Application Priority Data
Jul. 1, 2009  (DE) .......................... 10 2009 031 385

(51) Int. Cl.
*G08B 21/00*  (2006.01)
(52) U.S. Cl.
USPC ........... 340/5.81; 340/5.1; 340/5.4; 340/5.82; 235/380; 235/382; 726/22

(58) Field of Classification Search
USPC ......... 340/5.1, 5.4, 5.51, 5.8, 5.81, 5.82, 572, 340/10; 235/380, 382; 726/22
See application file for complete search history.

(56) References Cited

U.S. PATENT DOCUMENTS

| | | | |
|---|---|---|---|
| 6,325,421 B1 | 12/2001 | Huebner | |
| 6,659,351 B1 | 12/2003 | Bailleu et al. | |
| 6,742,713 B1 | 6/2004 | Trinkel | |
| 2006/0244595 A1* | 11/2006 | Malone et al. | 340/572.1 |
| 2007/0137462 A1* | 6/2007 | Barros et al. | 84/453 |
| 2007/0176898 A1* | 8/2007 | Suh | 345/158 |
| 2008/0027582 A1* | 1/2008 | Obinata et al. | 700/260 |
| 2009/0065575 A1 | 3/2009 | Phillips et al. | |
| 2010/0207730 A1 | 8/2010 | Boursier et al. | |

FOREIGN PATENT DOCUMENTS

| | | |
|---|---|---|
| EP | 2031548 | 4/2009 |
| WO | 2008092527 | 8/2008 |

OTHER PUBLICATIONS

Czeskis, A., et al., "RFIDs and Secret Handshakes: Defending Against Ghost-and-Leech Attacks and Unauthorized Reads with Context-Aware Communications", 15th ACM Conference of Computer and Communications Security 2008, pp. 474 to 490 (EPO Ref.: XP 002597239).
International Search Report in PCT/EP2010/059274, Sep. 3, 2010.

* cited by examiner

*Primary Examiner* — Nabil Syed
*Assistant Examiner* — Mark Rushing
(74) *Attorney, Agent, or Firm* — Workman Nydegger

(57) ABSTRACT

A method, portable data carrier (1) and system for releasing a transaction using acceleration sensors (4, 5, 6) and a structure (8) on the data carrier (1).

11 Claims, 4 Drawing Sheets

METHOD, PORTABLE DATA CARRIER, AND SYSTEM FOR RELEASING A TRANSACTION USING AN ACCELERATION SENSOR TO SENSE MECHANICAL OSCILLATIONS

BACKGROUND OF THE INVENTION

1. Field of the Invention

The invention relates to a method, a portable data carrier and a system for releasing a transaction or for preventing relay attacks using acceleration sensors and a structure on the data carrier.

2. Related Art

With portable data carriers, in particular contactless chip cards it is possible to carry out a so-called relay attack, also referred to as ghost-and-leech attack or wormhole attack. In its simplest form, this attack consists in expanding the communication area of a contactless chip card to a multiple of the original distance. In FIG. 1 there is outlined, for clarification, a possible setup with which a relay attack can be carried out. As a portable data carrier 1 there is shown a contactless chip card of a card holder. With this chip card, without said card holder's knowledge or consent, a communication is set up and a transaction is carried out at an end device 23 several meters away. This kind of transaction is basically not restricted. For example, such a transaction can be a payment transaction at a payment terminal 23.

This attack works because in today's contactless cards 1 there is no acknowledgement button and the card 1 only has to be presented to the end device 23 for payment. The attacker takes advantage of this property by sojourning, having a special terminal 26 also referred to as a leech terminal, close to the "authentic" contactless chip card 1 and amplifying the near-field communication 21 such that it still works over a distance of several meters. The attacker having a special data carrier 24, also referred to as a ghost, can thus pay, in a way, with the "authentic" chip card 1 from some distance. This attack can be expanded by the near-field communication 21 not only being amplified over some few meters, but being completely led via a separate network 27. The attack could happen in practice for example as follows: The first attacker sets up in an indoor swimming center or gym a communication 21 with a contactlessly working chip card in one of the lockers. If he can discover a contactless chip card 1, he connects it via an end device 26, for example a mobile phone, by means of a network 27 to a gateway 25 of a second attacker, who, almost any distance away, goes shopping with the ghost data carrier 24. The near-field communication 21 between the payment terminal 23 and the "authentic" chip card 1 is extended here via the mobile phone 26 and runs like an "authentic" transaction.

Cryptographic means cannot build a protection against this kind of attack. For solving this problem, for example a pushbutton could be mounted on the contactless card 1, which upon each transaction must be pressed for releasing the transaction. The push-button as a mechanical element severely wears out over the years in use, so that the functionality of the push-button is not permanently guaranteed. Alternatively, the contactless chip card 1 could also be kept in a shielded wallet. Both approaches quite reliably prevent an unnoticed communication with the contactless card 1, but have turned out to be not suitable for daily use. As a complementary defensive measure it would also be conceivable to analyze the time behaviour of each transaction made by the payment terminal 23, in order to recognize in this way the temporal delay caused by a passing on via the network 27. The reliability of this measure, however, strongly depends on the quality of the network 27, which, however, with the ongoing technical development becomes constantly better.

BRIEF SUMMARY OF THE DISCLOSURE

The object of the present invention is therefore to show a method, a system and a portable data carrier, with which the releasing of a transaction between a portable data carrier and an end device is effected more cost-efficiently, more securely and more easily. The existing infrastructure between data carriers and end devices should be able to remain in use here if possible.

According to the invention, the object is achieved by a method for releasing a transaction between a portable data carrier and an end device. For this purpose, the portable data carrier is first brought into an electromagnetic field. The EM field is generated here by the end device. The EM field serves as a power supply and for activating the portable data carrier. At first, no transactions are released between the portable data carrier and the end device. Or at least those transactions are not released, which include security-relevant information or data. In the next method step, mechanical oscillations are generated with the aid of a structure on the data carrier. These mechanical oscillations are subsequently captured in the portable data carrier by means of acceleration sensor. Then, the output signal of the acceleration sensor is evaluated or analyzed with regard to characteristic properties of the mechanical oscillation. As soon as a characteristic property of the oscillation has been recognized through the evaluation of the output signal, there is effected the releasing of the transaction by the portable data carrier. Alternatively to the releasing of transactions, the method can be employed to release a secured data area in the portable data carrier or to transmit security-critical information between end device and data carrier.

A portable data carrier for the purposes of this application is, in principle, not of any predetermined form or configuration. In particular, a portable data carrier is understood to be a chip card, smart card, contactless card or in general a security token for example with an identification function. Alternative configurations for example as a mass memory card, e.g. μSD card are also conceivable. Further, it is understood for the purposes of this application to be an electronic passport or different kind of identification medium, which contains security-critical information which should not generally be read out from the data carrier. For the broader purposes, the portable data carrier is a mobile phone with which transactions can be carried out with an end device, for example via a near-field communication. The mobile phone as a portable data carrier here has a near-field communication interface.

An end device is understood to be any kind of communication device with which the portable data carrier can communicate in particular in a contactless fashion. A communication is effected by way of example with a reading device, also termed terminal, standardized according to ISO/IEC 14443. The end device is for example a point-of-sale terminal, POS terminal for short, or a pay machine with near-field communication interface.

A transaction for the purposes of this application is understood to be a logical sequence of operations. A transaction is for example a payment transaction between a portable data carrier and an end device via a contactless interface. A transaction is alternatively also the readout of security-critical information, such as PIN numbers, personal data or general secrets, such as TAN numbers, passwords, and the like.

For the purposes of this application an acceleration sensor is understood to be a sensor which ascertains the acceleration of a body, for example by determining the inertial force acting on a test mass. An acceleration sensor measures linear self-motions and accelerations and then triggers, on the basis of the measurement result, switching operations dependent on the self-motion in space. One type of an acceleration sensor is a rotation sensor which ascertains the rotational self-motion around an axis. Merely by way of example, the single-axis rotation sensor LY530AL and the three-axis acceleration sensor LIS344ALH from the company ST Microelectronics are stated as discrete electronic components here.

Through the method of the invention, a portable data carrier is prevented in simple fashion from carrying out a transaction with an end device without the transaction having been previously released. With this method according to the invention a relay attack of the above-described type is very effectively prevented. This method is very cost-efficient, suitable for daily use and reliable.

In an advantageous embodiment, the portable data carrier is set into self-oscillation through the mechanical excitation. Then this self-oscillation of the data carrier is captured in the form of acceleration and evaluated by means of the acceleration sensor. The advantage in this embodiment is to be seen in that an acceleration of the data carrier is readily evaluable even upon minimum excitation with mechanical oscillation.

The characteristic property is preferably the time duration, the frequency and/or the amplitude of the mechanical oscillation. Accordingly, a transaction is only released when a target value of the characteristic property of the oscillation is exceeded, otherwise, the transaction is not released. Alternatively, there is advantageously checked whether a characteristic property of the oscillation lies in a strictly defined tolerance range. These characteristic properties can be captured very easily and securely for example with an evaluation unit.

In a preferred embodiment, the generated mechanical oscillations fluctuate in frequency. Alternatively or additionally, several mechanical oscillations are superimposed. The fluctuation of the frequencies and/or the superimposition of oscillations are evaluated as a characteristic property in the portable data carrier. The evaluation unit ascertains on the basis of these fluctuations and superimpositions of the frequency, whether the right or authentic structure is present on the data carrier and decides on the releasing of the transaction. Therefore, the protection against relay attacks is substantially increased.

In an alternative embodiment, the mechanical oscillations are generated by the data carrier being moved or rubbed with its structure on the outer surface of the end device. The oscillations arising from the friction are captured as accelerations in the portable data carrier and evaluated.

Likewise provided according to the invention is a portable data carrier for data transmission with an end device. The data carrier has a card body. Into the card body there is incorporated an integrated circuit. Furthermore, in the interior at a top side of the card body there is mounted an acceleration sensor, the acceleration sensor providing output signals to the integrated circuit. Onto the top side of the card body there is applied a structure. By means of this structure, mechanical oscillations are generatable, thereby the data transmission being releasable, i.e. can be released.

If the owner now runs for example his fingernail or a pen over the structure, mechanical oscillations are generated. These oscillations are detected, analyzed and evaluated in the interior of the card body. A transaction is released, as soon as the characteristic properties of the oscillation are beyond a target value or within a defined tolerance range. If the portable data carrier is a mobile phone, the structure is located preferably on the outside of the mobile phone housing. The capture, analysis and evaluation of the thus generated accelerations is effected either in a SIM card in the data carrier or in the mobile phone itself.

The structure is incorporated for example by means of laser, milling machine or embossing somewhere in the surface of the card body. Preferably, the card body is laminated and the structure is embossed on the laminate. In this way, a structure can be realized very easily and cost-efficient.

In a preferred embodiment the structure is arranged above the acceleration sensor. Thus it is possible for the generated mechanical oscillations to be ideally captured.

In principle, the acceleration sensor can be placed anywhere in the card body. Preferably, the acceleration sensor is mounted in a gap of the card body at the top side of the card body, so that the mechanical oscillations can be captured very well.

In an alternative embodiment, the acceleration sensor is incorporated into the integrated circuit, so that the manufacture of the portable data carrier according to the invention is cost-efficient.

It is also conceivable to place the acceleration sensor individually per data carrier somewhere in the card body. Due to the different placement, equal mechanical oscillations are differently captured by the acceleration sensor, since in particular the card body itself causes an attenuation of the mechanical oscillations. These different amplitudes of the oscillations can be evaluated as a characteristic property and be a releasing criterion.

In a preferred embodiment, the structure is configured individually per data carrier, so that the oscillations generatable by means of the structure are individual per data carrier. Such an individualization is for example the design of the form of the structure, e.g. circle, ellipse, triangle or square.

Moreover, according to the invention it is proposed that the structure has grooves or consists of grooves. These grooves are arranged as lines, circles, or waves and form the structure. It is provided according to the invention that the grooves in a structure have different depths and the grooves distributed over the structure have different spacings.

Through all these measures, fluctuations and superimpositions of the characteristic properties of the generated mechanical oscillations are obtained. It is preferably provided to configure the structures individually per data carrier. In this way, an individualization of the data carrier is achieved, a releasing is effected only when for the "original" card body having the respective individual structure mechanical oscillations in specified tolerances can be captured and evaluated.

Finally, according to the invention there is proposed a system for preventing a relay attack. The system comprises a portable data carrier of the already described type and an end device, whereby through the structure on the data carrier there are generated mechanical oscillations and the transaction between data carrier and end device is released only when a target value of a characteristic property of the mechanical oscillation is exceeded.

The target value may be stored in a data memory in the data carrier and be retrieved during the evaluation of the characteristic property of the oscillation. Alternatively, a strictly defined tolerance range, for example a percentage deviation from the captured value of the characteristic property may be stored in the data memory.

DESCRIPTION OF THE DRAWINGS

In the following, embodiments of the invention are described by way of example with reference to Figures. The same components in the Figures have the same reference signs. The Figures are not true to scale, in particular individual parts may be represented in an exaggerated size and very simplified.

DETAILED DESCRIPTION OF PREFERRED EMBODIMENTS OF THE INVENTION

Figure 1:
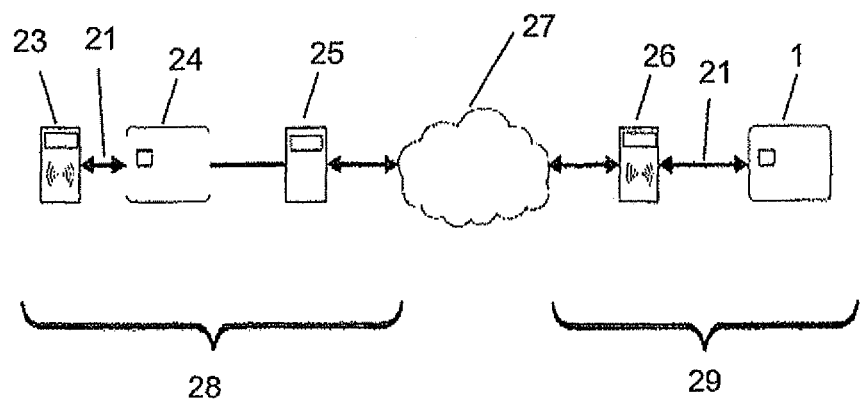
FIG. 1 shows a sketched illustration of a relay attack via an additional network

The explanations regarding FIG. 1 which are substantial for this invention can be inferred from the introduction to the invention.

Figure 2:
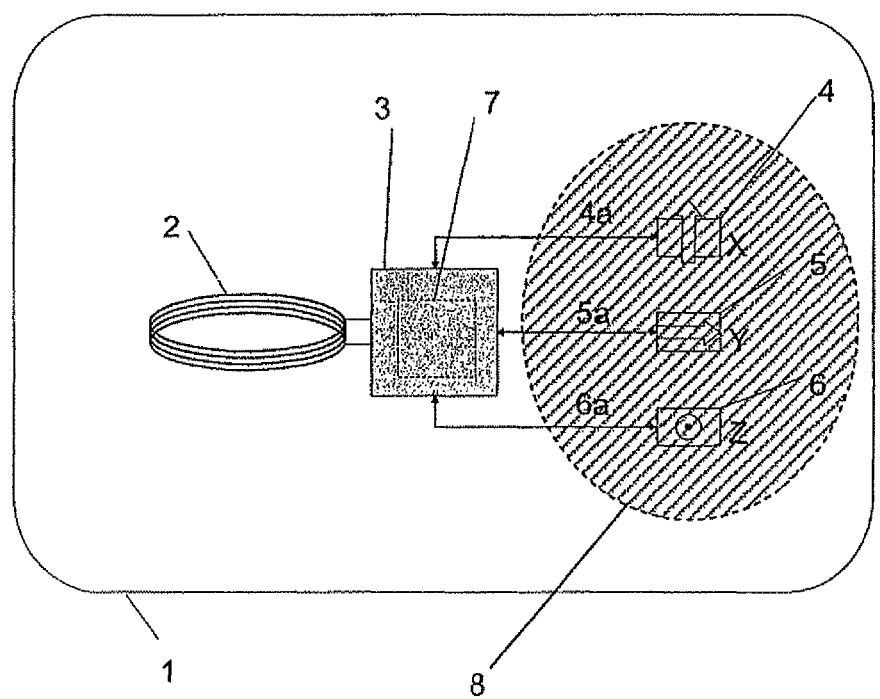
FIG. 2 shows a block diagram of a portable data carrier according to the invention having structure for releasing a transaction, in a plan view

In FIG. 2 there is shown in a plan view a block diagram of a portable data carrier 1 according to the invention having a structure 8. The portable data carrier 1 here is shown in the form of a chip card, also termed smart card. For the communication with an end device (not shown here) there is incorporated into the body of the data carrier 1 an antenna 2 for the near-field communication 21. The antenna 2 is electrically coupled via antenna ports with an integrated circuit 3. The integrated circuit 3 has a releasing apparatus 7 according to the invention. Furthermore, into the portable data carrier 3 there are incorporated acceleration sensors 4, 5, 6. The acceleration sensor 4 here captures accelerations in the X direction, the sensor 5 accelerations in the Y direction and the acceleration sensor 6 in the Z direction. The output signals 4a, 5a and 6a of the acceleration sensors 4, 5, 6 are supplied to the integrated circuit 3.

Figure 3:
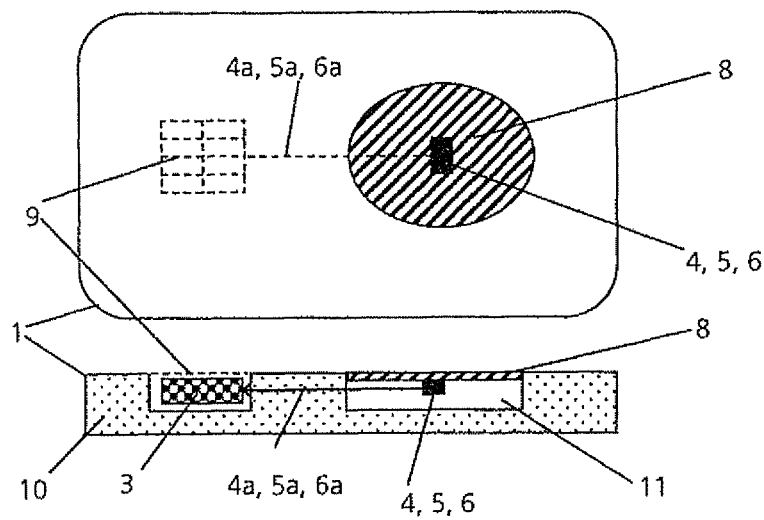
FIG. 3 shows a block diagram of an alternative portable data carrier in comparison to FIG. 2, in a plan view and cross-section

In FIG. 3 there is shown an alternative portable data carrier 1 in cross-section and in a plan view in a block diagram. In comparison to FIG. 2, the data carrier 1 has a contact field 9. The contact field 9 is optional and not essential to the invention. In the cross-section of FIG. 3 there can be recognized that the card body 10 has two gaps 11. Into a first gap there is incorporated the integrated circuit 3 with releasing apparatus 7. Into the second gap there are incorporated acceleration sensors 4, 5, 6. Integrated circuit 3 and acceleration sensors 4, 5, 6 can alternatively be incorporated into the card body 10. The card body 10 is laminated. The number of acceleration sensors can alternatively be higher or lower than that shown in this example. Primarily, it is understood in these embodiments a three-axis acceleration sensor, which as a component or module is acceleration-sensitive in three different directions.

In FIG. 3, acceleration sensor 4, 5, 6 is adhesively bonded into the gap. As an adhesive there are provided adhesives usual for the manufacture of chip cards. Above the sensor 4, 5, 6 at the top side of the card body 10 there is arranged the structure 8. Through these arrangements, the mechanical oscillations generated with the structure are optimally captured. The placement of the structure 8 in FIG. 3 is central. In alternative embodiments it can be arbitrarily chosen and thus also produces an individual configuration criterion and furthermore leads to an individual releasing criterion. The acceleration signals 4a, 5a, 6a are supplied to the integrated circuit 3. Alternatively, a complete integration of the sensors 4, 5, 6 into the integrated circuit 3 is possible. Such a variant saves space and reduces the manufacturing costs.

The structure in the FIGS. 2 and 3 has the form of an ellipse. Every other geometric form, for example circle, triangle, rectangle, is also possible and causes corresponding individual mechanical oscillations, which can be used as a releasing criterion. The structure of the FIGS. 2 and 3 has grooves. In this embodiment, the grooves are arranged as oblique lines, having the same depth and spacing.

An individual structure 8 for each data carrier 1 is also conceivable, here the grooves have different depths and thus cause different amplitude heights of the oscillation. The grooves are incorporated into the card body 10 for example with a laser, a milling cutter or by means of embossing. If the spacing between the grooves is configured differently, different oscillation frequencies are generated and superimposed. A calculation and subsequent evaluation of the spectrum, for example by means of FFT, is analyzed as a characteristic property of the mechanical oscillations and used as a releasing criterion.

If the portable data carrier 1 according to FIG. 2 or 3 is brought into an electromagnetic field, EM field for short, generated by an end device, the antenna 2 takes energy from the generated EM field and makes available this energy to the integrated circuit 3. According to the invention it is provided that, upon the entry and sojourn of the data carrier 1, the output signals 4a, 5a, 6a of the acceleration sensors 4, 5, 6 are evaluated with regard to a characteristic property and therefrom is derived the decision on releasing or not releasing a transaction between data carrier 1 and end device 23. The integrated circuit 3 thus does not release a transaction with the end device until the acceleration sensors 4, 5, 6 capture accelerations in such a form, and supply them as output signals 4a, 5a, 6a to the integrated circuit 3, that a characteristic property of mechanical oscillation has been ascertained.

In the FIGS. 2 and 3, the acceleration sensors 4, 5, 6 are incorporated into the body of the portable data carrier 3 in a manner separated from the circuit 3. Alternatively, the acceleration sensors 4, 5, 6 are incorporated into the integrated circuit 3. Alternatively, there can be provided only one acceleration sensor or at least one rotation sensor (not shown in the Figures) instead of the three acceleration sensors 4, 5, 6.

The data carrier 1 is so constituted that it carries out, upon excitation by means of mechanical oscillation, a sufficiently detectable acceleration in the interior of the data carrier body.

Figure 4:
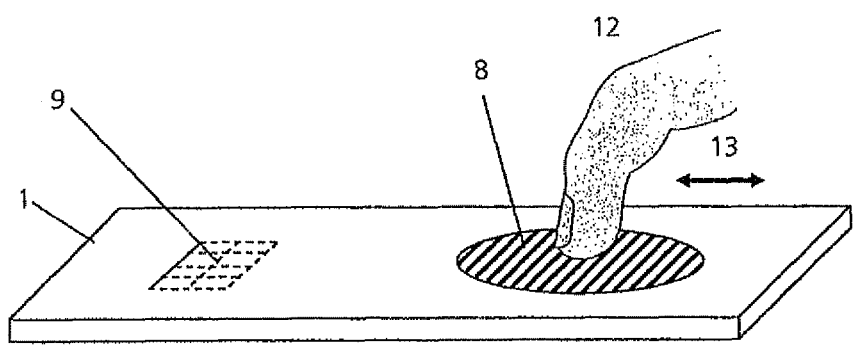
FIG. 4 shows a sketched representation of the generation of mechanical oscillations at a data carrier according to the invention with fingernail

In FIG. 4, there is shown a three-dimensional illustration of the data carrier 1 according to the invention. As silhouettes there are shown the contact field 9 and the structure 8 according to the invention on the top side of the card body 10. A user who wants to release a transaction with the end device 23, runs with his fingernail 12 over the structure 8. This generates mechanical oscillations which are captured by the motion sensors 4, 5, 6. An evaluation of the mechanical oscillations with regard to characteristic properties is carried out in the integrated circuit 3.

As evaluable characteristic properties, the following parameters of the mechanical oscillation are mentioned as examples:

a) The amplitude of the mechanical oscillation. The amplitude can be influenced by the placement of the motion sensor 4, 5, 6 in the card body 10, the thickness of the card body between the structure 8 and the motion sensor 4, 5, 6, and the depth of the grooves of the structure 8.
b) The frequency of the mechanical oscillation. The frequency is influenceable by the spacings of the grooves in structure 8 being different, the arrangement of the grooves in the structure being inhomogeneous and the size of the structure 8 of the individual data carriers 1 being different.
c) The time duration of all mechanical oscillations. The time duration may vary due to the size and the form of the structure 8.
d) The frequency components of the mechanical oscillation. By calculating the spectrum of the acceleration signals 4a, 5a and 6a to be evaluated, there are recognized superimposed and fluctuating frequencies due to different groove spacings within a structure 8. Using an FFT, the presence of different frequencies in the oscillation patterns of the mechanical oscillations can be checked.

These characteristic properties can also be arbitrarily combined for a required releasing. The structure 8, and the evaluation of the characteristic properties of the generated mechanical oscillations connected therewith, is configured equally on all data carriers 1 for a simple releasing of the transaction. Here, attention is paid only to the fact that a user generates mechanical oscillation, so that for a transaction an active intervention of the user is necessary. A relay attack is thus prevented. Alternatively, a releasing can also be configured such that each data carrier 1 has an individual structure 8. Then this structure varies in form, size, number of grooves, depth of the grooves, arrangement of the grooves, thickness of the card body 10 between acceleration sensor 4, 5, 6 and structure 8, placement of the structure 8 on the card body, placement of the acceleration sensor 4, 5, 6 within the card body and much more. An evaluation of the signals 4a, 5a, 6a of all or some of the characteristic properties of the mechanical oscillation yields whether a releasing is effected or not.

Figure 5:
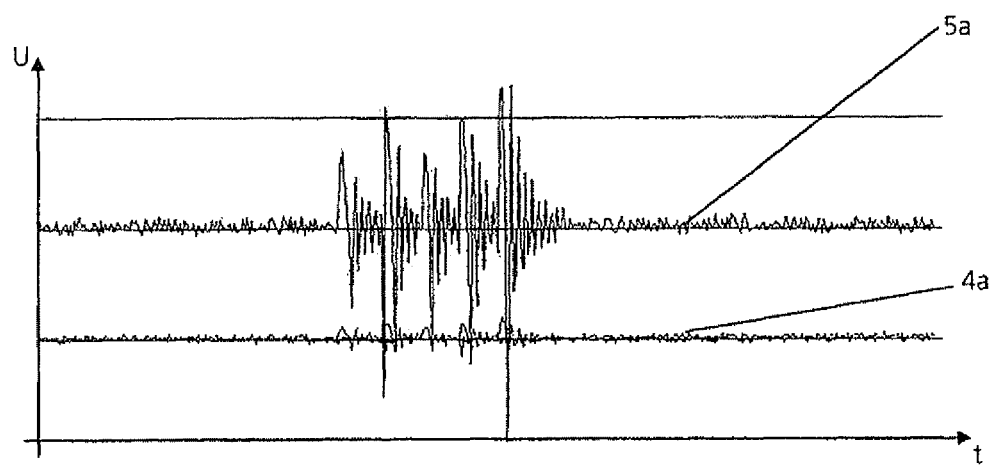
FIG. 5 shows an exemplary voltage-time diagram of the acceleration sensor output signals in X, Y, and Z direction upon the generation of mechanical oscillations in the data carrier by means of fingernail movement over the structure

An example for the sensor measurement values of a pulsed circular vibration is shown in FIG. 5. The measurement curves here represent the oscillation axes X, Y according to the signals 4a, 5a, of the acceleration sensors 4, 5. It is provided according to the invention that the data carrier 1 analyzes and evaluates the oscillation patterns of the captured oscillations with regard to at least one of the mentioned characteristic properties. If the measurement values are within a tolerance range of an expected range, it is provided that the envisaged transaction with the data carrier 1 is released. Alternatively, also the access to a selected memory area of the data carrier 1 and/or the further communication between the end device 23 and the data carrier 1 can be released. The tolerance range can also be a target value threshold of one of the characteristic properties of the mechanical oscillation, which for a releasing must be exceeded.

Figure 6:
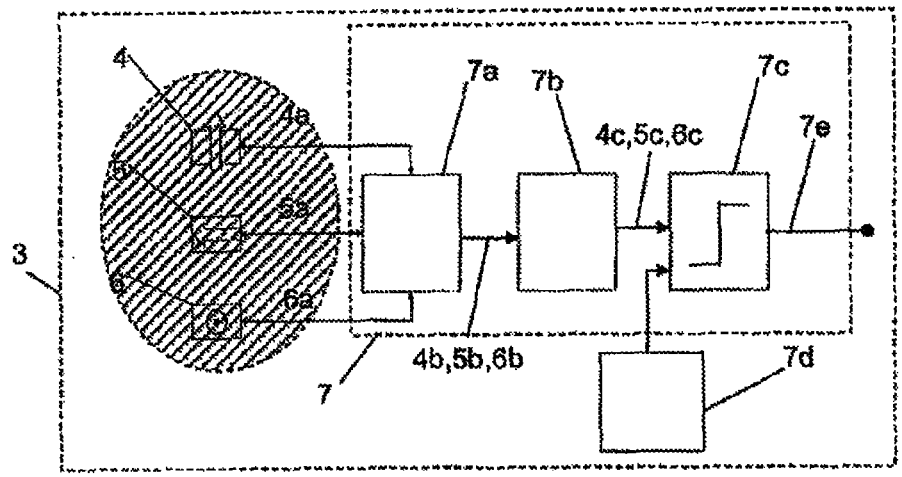
FIG. 6 shows a detailed block diagram of an integrated circuit in a portable data carrier according to FIG. 2 or 3

A detailed block diagram of an integrated circuit 3 incorporated in the portable data carrier 1 of the preceding FIGS. 2, 3, 4 is shown in FIG. 6. Here, the sensors 4, 5, 6 are also arranged within the integrated circuit 3. The output signals 4a, 5a, 6a of the sensors 4, 5, 6 are supplied to the evaluation unit 7a. An evaluation of the signals can be for example the amplitude height, the time duration or the frequency. In principle, these evaluated signals can be supplied directly to the comparing unit 7c, in order to be compared there, if necessary, with a target value stored in a target value memory 7d in the data carrier 1. When the target value is exceeded, the releasing of the transaction is effected by a release signal 7e. Alternatively, as shown in FIG. 6, the evaluated signals are first supplied to a calculation unit 7b. This calculation unit 7c calculates the signals 4c, 5c, 6c. As a calculation there is provided for example an FFT-analysis from the evaluated signals 4b, 5b, 6b.

In a second embodiment of the invention it is provided that the data carrier 1 is excited by mechanical oscillations by the structure 8 of the data carrier 1 being rubbed on a top side of the end device 23. The thus resulting mechanical oscillations or the self-acceleration of the data carrier 1 are captured and evaluated by the acceleration sensors 4, 5, 6.

Alternatively, the data carrier 1 is a mobile phone with NFC interface. A user of the mobile phone, who for example wants to carry out a payment transaction, does not have to acknowledge this transaction with the keyboard of the mobile phone, but the releasing of the transaction is effected by the user generating mechanical oscillations with the structure 8 mounted to the mobile phone housing. The releasing of the transaction is effected as soon as characteristic properties of the oscillations in the mobile phone have been captured and evaluated. In this application, the terms mobile phone, PDA, communicator, organizer, electronic calendar and the like are used as synonyms.

Figure 7:
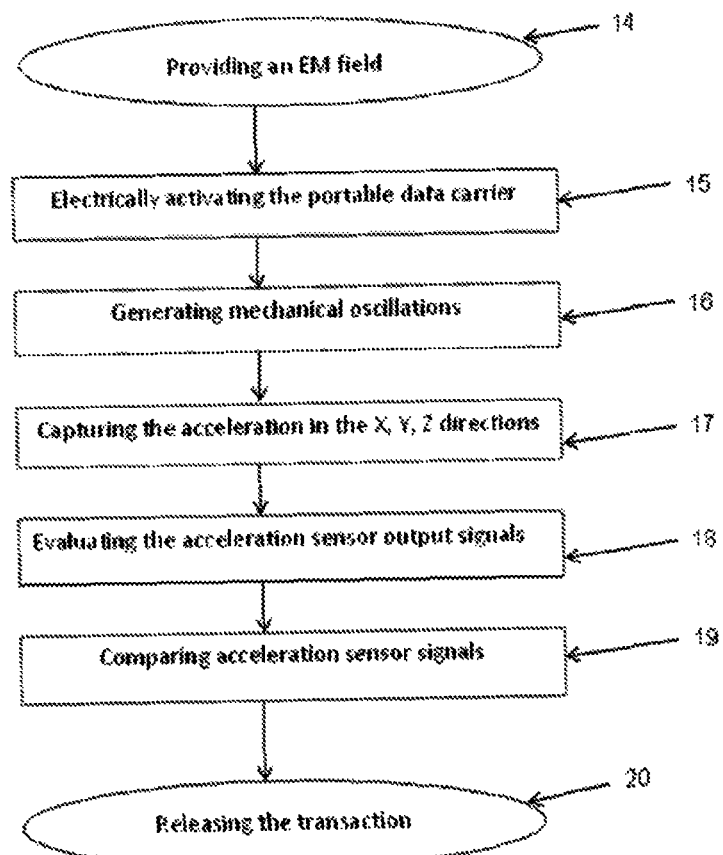
FIG. 7 shows a flowchart of a method according to the invention for releasing a transaction between a portable data carrier and an end device

In FIG. 7 there is shown an exemplary flowchart for a method according to the invention for releasing a transaction between end device 23 and a portable data carrier 1. By providing 14 an EM field through the end device 23, the portable data carrier 1 is electrically activated 15. Through the structure 8 on data carrier 1 mechanical oscillations are generated. Then there is effected the capturing 17 of the acceleration in the X, Y, Z direction by means of the sensors 4, 5, 6. The accelerations are ascertained by evaluating and/or calculating 18 the acceleration sensor output signals 4a, 5a, 6a. In step 19 there follows the comparison of the signal values 4c, 5c, 6c with regard to characteristic properties, such as for example frequency, amplitude, time duration, frequency fluctuation, frequency superimposition, frequency components, or the like. In method step 20 there is finally effected the releasing of the transaction, when a target value is exceeded or a defined tolerance range of the calculated values of the characteristic properties of the mechanical oscillations is complied with. Target values and tolerance range here are preferably stored in a memory area 7d of the data carrier 1.

The method according to the invention is preferably implemented at least partly in the form of a computer software in the integrated circuit 3. The integrated circuit 3 then performs the corresponding method steps as implemented program steps.

Alternatively to the releasing of the transaction, it is also conceivable that a secure data memory or the transmission of security-critical information, for example secrets such as PIN or TAN numbers, are released.

Figure 8:
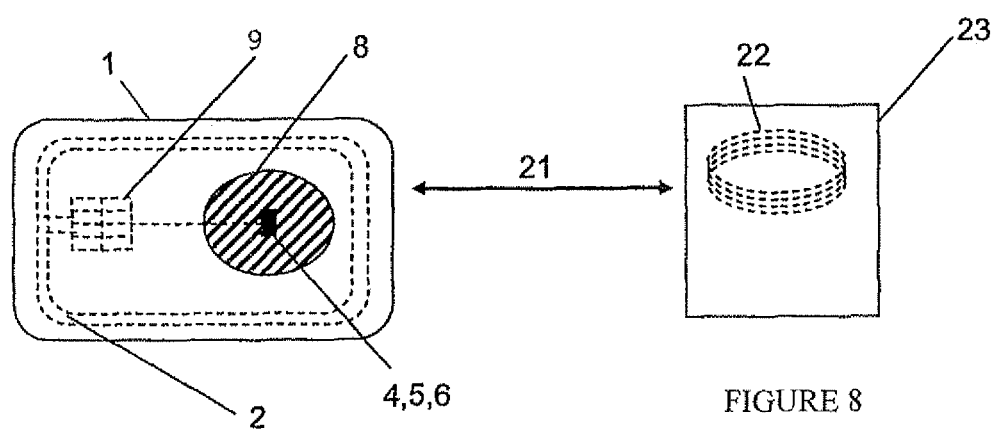
FIG. 8 shows a system according to the invention for preventing a relay attack

In FIG. 8 there is represented a system according to the invention for releasing a transaction between a portable data carrier 1 and an end device 23. The data carrier 1 here corresponds to the data carrier 1 described in FIGS. 2, 3 and 4. The end device 23, also termed terminal, is not limited in its function and is for example a reading device, POS terminal or payment terminal. The end device 23 has an antenna 22. Thus, a near-field communication 21 takes place contactlessly by means of the antennas 2 and 22. This communication is standardized for example by means of ISO/IEC 14443. The data carrier 1 has the structure 8, with which are generated mechanical oscillations for example with a user's fingernail, a pen or by rubbing the data carrier 1 on the end device 23. The mechanical oscillation is then evaluated, calculated and/or analyzed according to the already described method with regard to the above-mentioned characteristic properties. The transaction is released only when the mechanical oscillations exceed a target value of a characteristic property or are in a firmly defined tolerance range for example ±5%.

The invention claimed is:

1. A method for releasing a transaction between a portable data carrier and an end device, comprising the steps:
   a) bringing the portable data carrier into an electromagnetic field generated by the end device, and supplying the portable data carrier with energy from the electromagnetic field,
   b) generating mechanical oscillations using a structure on the data carrier,
   c) capturing the mechanical oscillations in the portable data carrier by an acceleration sensor,
   d) evaluating an output signal of the acceleration sensor with regard to characteristic properties of the mechanical oscillations,
   e) releasing the transaction by the portable data carrier as soon as a characteristic property of the oscillations has been recognized by said evaluating of the output signal,
   wherein several mechanical oscillations are superimposed upon the generation and this oscillation superimposition is evaluated in the portable data carrier as a characteristic property.

2. The method according to claim 1, wherein the portable data carrier is set into self-oscillation through the generation of the mechanical oscillations and this self-oscillation is captured and evaluated.

3. The method according to claim 1, wherein as a characteristic property, the time duration, the frequency or the amplitude of the mechanical oscillation is evaluated.

4. The method according to claim 1, wherein the mechanical oscillations fluctuate in frequency and the frequency fluctuation is evaluated in the portable data carrier as a characteristic property.

5. The method according to claim 1, wherein, for generating the mechanical oscillations, the data carrier is rubbed on an outer surface of the end device.

6. A portable data carrier useable for data transmission with an end device, comprising:
   a card body comprising,
   an integrated circuit,
   an acceleration sensor mounted in the interior of the card body at a top side thereof,
   the acceleration sensor providing output signals to the integrated circuit, and
   a structure on a top side of the card body, capable of generating mechanical oscillations that cause release of data transmission via the acceleration sensor and the integrated circuit,
   wherein the structure comprises grooves, said grooves being arranged linearly, circular or wavelike in the structure, and
   wherein the grooves have different depths and have, distributed over the structure, different spacings.

7. The portable data carrier according to claim 6, wherein the structure is located above the acceleration sensor.

8. A system for preventing a relay attack, comprising:
   the portable data carrier as recited in claim 7, and
   an end device,
   wherein a mechanical oscillation generated in the portable data carrier via the structure releases a transaction between the data carrier and the end device only when a target value of a characteristic feature of the mechanical oscillation is exceeded.

9. The portable data carrier according to claim 6, wherein the acceleration sensor is mounted toward the top side of the card body in a gap of the card body.

10. The portable data carrier according to claim 6, wherein the structure is configured individually per data carrier so that the oscillations generated by the structure are individual per data carrier.

11. The portable data carrier according to claim 6, wherein the acceleration sensor is placed in the card body individually per data carrier.

* * * * *